(12) United States Patent
Tachibana

(10) Patent No.: US 11,351,639 B2
(45) Date of Patent: Jun. 7, 2022

(54) WORKING SYSTEM AND WORK METHOD

(71) Applicant: HIRATA CORPORATION, Kumamoto (JP)

(72) Inventor: Katsuyoshi Tachibana, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 17/040,584

(22) PCT Filed: Mar. 29, 2018

(86) PCT No.: PCT/JP2018/013347
§ 371 (c)(1),
(2) Date: Dec. 17, 2020

(87) PCT Pub. No.: WO2019/186925
PCT Pub. Date: Oct. 3, 2019

(65) Prior Publication Data
US 2021/0094134 A1 Apr. 1, 2021

(51) Int. Cl.
*B23P 19/04* (2006.01)
*B23P 19/00* (2006.01)
(Continued)

(52) U.S. Cl.
CPC ............ *B23P 19/04* (2013.01); *B23P 19/002* (2013.01); *B23P 19/008* (2013.01); *B23P 21/004* (2013.01); *B23Q 1/015* (2013.01)

(58) Field of Classification Search
CPC ..... B23P 21/004; B23P 19/008; B23P 19/002; B23P 19/04; H05K 13/0495;
(Continued)

(56) References Cited

U.S. PATENT DOCUMENTS 5,271,490 A * 12/1993 Sticht .............. B23P 21/004
198/346.1
6,279,224 B1 * 8/2001 Wirtz ................ B23Q 41/06
29/711
(Continued)

FOREIGN PATENT DOCUMENTS

CN 104221485 A 12/2014
CN 104787566 A 7/2015
(Continued)

OTHER PUBLICATIONS

Translation of JPH05275899 (Year: 1993).*
(Continued)

*Primary Examiner* — Matthew P Travers
(74) *Attorney, Agent, or Firm* — Buchanan Ingersoll & Rooney PC

(57) ABSTRACT

A working system includes a first work station and a second work station. The first work station includes a first conveying unit, a second conveying unit, a first positioning unit, and a first work unit that carries out a predetermined work for a workpiece positioned on the first conveying unit. The second work station includes a third conveying unit, a fourth conveying unit, a second positioning unit, and a second work unit that carries out a predetermined work for the workpiece positioned on the fourth conveying unit. The third conveying unit is connected to a downstream portion of the first conveying unit, and the fourth conveying unit is connected to a downstream portion of the second conveying unit.

16 Claims, 7 Drawing Sheets

(51) Int. Cl.
*B23P 21/00* (2006.01)
*B23Q 1/01* (2006.01)

(58) Field of Classification Search
CPC ............ Y10T 29/49829; Y10T 29/534; Y10T 29/53409; Y10T 29/53539–53548; B23Q 7/1405; B23Q 7/1421; B23Q 1/012; B23Q 1/015; B23Q 11/0891
See application file for complete search history.

(56) References Cited

U.S. PATENT DOCUMENTS

| | | | |
|---|---|---|---|
| 7,434,675 B1* | 10/2008 | Rohm ................ | H05K 13/0061 198/346.2 |
| 2003/0161714 A1* | 8/2003 | Blattner ............ | H01L 21/67715 198/347.1 |
| 2004/0060170 A1* | 4/2004 | Gieskes ............. | H05K 13/0061 29/740 |
| 2005/0034960 A1 | 2/2005 | Shimamura et al. | |
| 2006/0080827 A1* | 4/2006 | Saito ................. | G05B 19/4188 29/592 |
| 2009/0151148 A1* | 6/2009 | Reinisch ............. | B23Q 37/00 29/564.1 |
| 2015/0271925 A1 | 9/2015 | Mori et al. | |
| 2016/0021804 A1* | 1/2016 | Mantani ............. | H05K 13/0495 29/739 |
| 2019/0329987 A1* | 10/2019 | Meschenmoser ...... | B65G 47/53 |

FOREIGN PATENT DOCUMENTS

| | | |
|---|---|---|
| CN | 105752634 A | 7/2016 |
| CN | 105983856 A | 10/2016 |
| CN | 205684978 U | 11/2016 |
| EP | 1046459 A2 | 10/2000 |
| JP | H05275899 A | 10/1993 |
| JP | 2012243940 A | 12/2012 |
| JP | 2015185546 A | 10/2015 |
| WO | 2005/009100 A1 | 1/2005 |
| WO | 2008026278 A1 | 3/2008 |
| WO | 2009060705 A1 | 5/2009 |
| WO | 2010/079792 A1 | 7/2010 |

OTHER PUBLICATIONS

International Search Report (PCT/ISA/210) dated May 29, 2018, by the Japan Patent Office as the International Searching Authority for International Application No. PCT/JP2018/013347.
Extended European Search Report dated Oct. 11, 2021, issued in corresponding European Application No. 18912829.1. (12 pages).

* cited by examiner

WORKING SYSTEM AND WORK METHOD

TECHNICAL FIELD

The present invention relates to a working system for carrying out a predetermined work for a workpiece, and a work method using the working system.

BACKGROUND ART

For example, as disclosed in Patent Literature 1, a working system is known which includes a plurality of work stations including a work unit that carries out a predetermined work for a workpiece and continuously carries out a plurality of works.

In this type of the working system, a work time in the work station may be long, and a desired cycle time may not be achieved in some cases. In this case, a method may be adopted as follows. Two, three, or more work stations for carrying out the same work are disposed in parallel, and the work stations carry out the work for the plurality of workpieces at the same time. In this manner, the number of workpieces processed per unit time increases. Accordingly, an actual cycle time can be shortened.

FIG. 7 is a plan view representing an example of a working system in the related art. A work station 100A1 carries out the predetermined work for a workpiece W-1 (W), and the workpiece W after the work is completed is conveyed to subsequent work stations 100B and 100C (subsequent step) along a conveying direction indicated by an arrow F. Each of the work stations 100A to 100C includes a conveying line 111 that conveys the workpiece W along the conveying direction F, positioning units 130a to 130c that stop the workpiece W conveyed by the conveying line 111 at a predetermined position, and work units 113a to 113c that carry out the predetermined work for the workpiece W stopped by the positioning units 130a to 130c.

Among the respective work stations 100A to 100C, two work stations 100 (for example, the work stations 100A in FIG. 7) having a long cycle time are disposed in parallel. Specifically, a branch line is formed for the conveying line 111 by conveying units 112a1 to 112a3, and a work station 100A2 is disposed in the conveying unit 112a2 in the branch line. In this manner, a workpiece W-2 (W) can be moved to branch from a first lane L1 (conveying line 111) to a second lane L2 (branch line), and conversely, the workpiece W-2 (W) can be moved to merge from the second lane L2 to the first lane L1.

CITATION LIST

Patent Literature

Patent Literature 1

PCT International Publication No. WO2008/026278

SUMMARY OF INVENTION

Technical Problem

According to the working system in the related art having the above-described configuration, the work stations 100A1 and 100A2 are disposed in parallel so that a wide dead space (region that does not contribute to production) is formed as indicated by a reference sign DS in FIG. 7. In order to minimize an installation area or the region DS for disposing the work stations 100A1 and 100A2 in parallel, it is conceivable to shorten a distance between the first lane L1 and the second lane L2 as much as possible. However, a size of the work stations 100A1 and 100A2 themselves cannot be substantially changed. In view of ensured passage or workability when a worker accesses the work stations 100A1 and 100A2 for maintenance, there is a limitation in achieving a space saving structure by bringing the work stations 100A1 and 100A2 close to each other.

The present invention is made in view of the above-described circumstances, and an object thereof is to provide a working system in which satisfactory productivity is achieved and an installation area and a dead space of facilities in a factory can be reduced, and to provide a work method using the working system.

Solution to Problem

The present invention adopts the following configurations in order to solve the above-described problem and achieve the above-described object.

According to one aspect of the present invention, a working system is provided that carries out a predetermined work for a conveyed workpiece. The working system includes a first work station that carries out a predetermined work for the workpiece, and a second work station disposed in series downstream of the first work station to carry out a predetermined work for the workpiece. The first work station includes a first conveying unit that conveys the workpiece, a second conveying unit juxtaposed with the first conveying unit to convey the workpiece, a first positioning unit that positions the workpiece conveyed by the first conveying unit at a predetermined position inside the first work station, and a first work unit that carries out a predetermined work for the workpiece positioned on the first conveying unit by the first positioning unit. The second work station includes a third conveying unit that conveys the workpiece, a fourth conveying unit juxtaposed with the third conveying unit to convey the workpiece, a second positioning unit that positions the workpiece conveyed by the fourth conveying unit at a predetermined position inside the second work station, and a second work unit that carries out a predetermined work for the workpiece positioned on the fourth conveying unit by the second positioning unit. The third conveying unit is connected to a downstream portion of the first conveying unit. The fourth conveying unit is connected to a downstream portion of the second conveying unit.

According to another aspect of the present invention, a work method using the working system is provided. The work method includes a step of conveying a first workpiece out of a plurality of the workpieces to the first conveying unit of the first work station, causing the first positioning unit to position the first workpiece, and causing the first work unit to carry out the predetermined work for the first workpiece, a step of causing the first workpiece conveyed from the first conveying unit to pass through the second work station by using the third conveying unit, a step of causing a second workpiece out of the plurality of workpieces to pass through the first work station by using the second conveying unit, and a step of conveying the second workpiece conveyed from the second conveying unit to the fourth conveying unit of the second work station, causing the second positioning unit to position the second workpiece, and causing the second work unit to carry out the predetermined work for the second workpiece.

Advantageous Effects of Invention

According to the working system and the work method in the above-described aspects of the present invention, satisfactory productivity is achieved, and an installation area and a dead space of facilities in a factory can be reduced.

DESCRIPTION OF EMBODIMENTS

A working system and a work method according to an embodiment of the present invention will be described below with reference to FIGS. 1 to 6.

[Working System]

Figure 1:
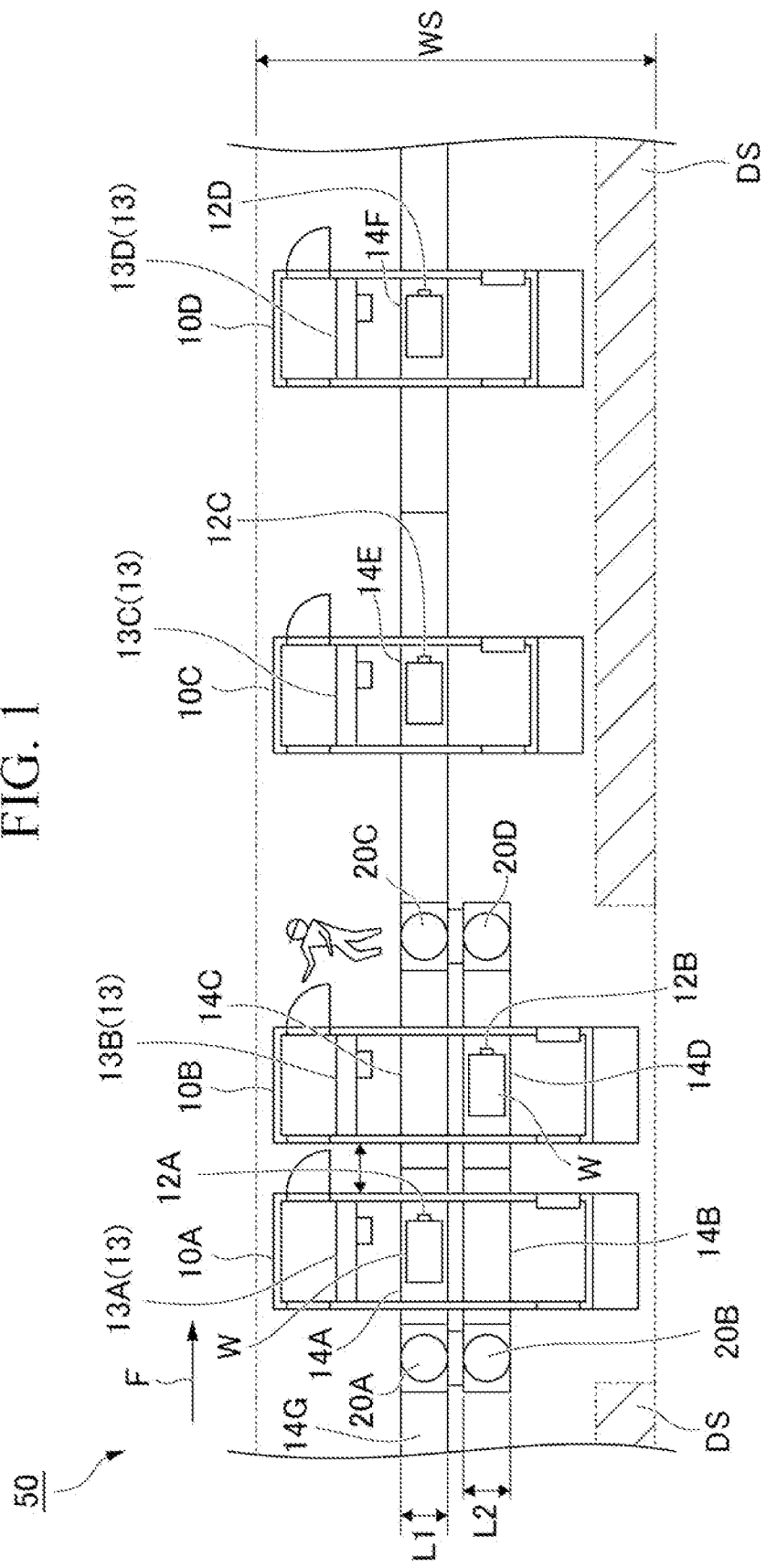
FIG. 1 is a plan view representing an example of a production line using a working system 50 according to an embodiment of the present invention.

FIG. 1 is a plan view representing an example of a production line using a working system 50 according to the present embodiment. In the following description, in a conveying direction F indicated by an arrow in FIG. 1, a starting point side (left side in FIG. 1) may be referred to as an upstream side, and an ending point side (right side in FIG. 1) may be referred to as a downstream side in some cases.

The working system 50 is configured to mainly include work stations 10A and 10B. The production line is configured so that a plurality of work stations 10C and 10D are connected to the working system 50. In the production line, each of the work stations 10A to 10D carries out work for a workpiece W conveyed by each of the conveying units 14A to 14F. As the conveying units 14A to 14F, for example, a conveyor such as a free flow conveyor and a roller conveyor can be used.

As illustrated in FIG. 1, the respective work stations 10A to 10D are disposed in series along the conveying direction of the workpiece W.

In addition, a turntable 20A is disposed on the upstream side of the conveying unit 14A, a turntable 20B is disposed on the upstream side of the conveying unit 14B, a turntable 20C is disposed between the conveying unit 14C and the conveying unit 14E, and a turntable 20D is disposed on the downstream side of the conveying unit 14D.

Then, in the work stations 10A and 10B, each downstream end of the conveying units 14A and 14B of the work station 10A on the upstream side and each upstream end of the conveying units 14C and 14D of the work station 10B on the downstream side are connected to each other. The two work stations 10A and 10B are disposed close to each other.

The two conveying units 14A and 14B are juxtaposed with each other in the work station 10A. The two conveying units 14C and 14D are juxtaposed with each other in the work station 10B. On the other hand, the conveying units 14E and 14F are disposed in the work stations 10C and 10D respectively.

A positioning unit 12A (12) described later is disposed on one of the two conveying units 14A or 14B of the work station 10A. In addition, a positioning unit 12B (12) described later is disposed on one of the two conveying units 14D and 14C of the work station 10B.

Here, as illustrated in FIG. 1, the positioning unit 12 is disposed in one of the connected conveying units 14 between the work stations 10A and 10B. That is, in the work station 10A, a positioning unit 12A is provided in the conveying unit 14A on a line L1. In the work station 10B, the positioning unit 12B is provided in the conveying unit 14D on a line L2. In addition, the conveying units 14E and 14F of the respective work stations 10C and 10D also include positioning units 12C and 12D.

A conveying route of the workpiece W in the production line is formed by the respective conveying units 14A to 14F included in the respective work stations 10A to 10D.

More specifically, the first conveying lane L1 is formed by aligning the conveying units 14A, 14C, 14E, and 14F in a straight line.

In addition, the second conveying lane L2 is formed by aligning the conveying units 14B and 14D in a straight line. The second conveying lane L2 is disposed parallel to the first conveying lane L1.

Then, the turntables 20A and 20C are provided at two locations on the first conveying lane L1. Similarly, the turntables 20B and 20D are also provided at two locations on the second conveying lane L2. The turntables 20A and 20C on the first conveying lane L1 and the turntables 20B and 20D on the second conveying lane L2 are disposed adjacent to each other, and the workpiece W can be conveyed between both of them. If necessary, a conveying unit (not illustrated) may be provided between the turntables 20A and 20B and between the turntables 20C and 20D. Therefore, any workpiece W out of a plurality of workpieces W conveyed on the first conveying lane L1 is branched from the first conveying lane L1 to the second conveying lane L2 and conveyed. In this case, a traveling direction of the workpiece W is changed 90° on the turntable 20A, and the workpiece W is transferred to the turntable 20B adjacent thereto. Then, the traveling direction of the workpiece W is changed 90° again on the turntable 20B along the conveying direction F, and the workpiece W is conveyed on the second conveying lane L2. When the workpiece W returns again from the second conveying lane L2 to the first conveying lane L1, the traveling direction of the workpiece W is changed 90° toward the first conveying lane L1 on the turntable 20D, and the workpiece W is transferred to the turntable 20C. Furthermore, the traveling direction of the workpiece W is changed 90° again along the conveying direction F on the turntable 20C. In this manner, the workpiece W is conveyed again on the first conveying lane L1.

Structures of the work stations 10A and 10B in the working system 50 according to the present embodiment are substantially common to each other. Thus, the work station 10A will be described below with reference to FIGS. 2 to 5.

Figure 2:
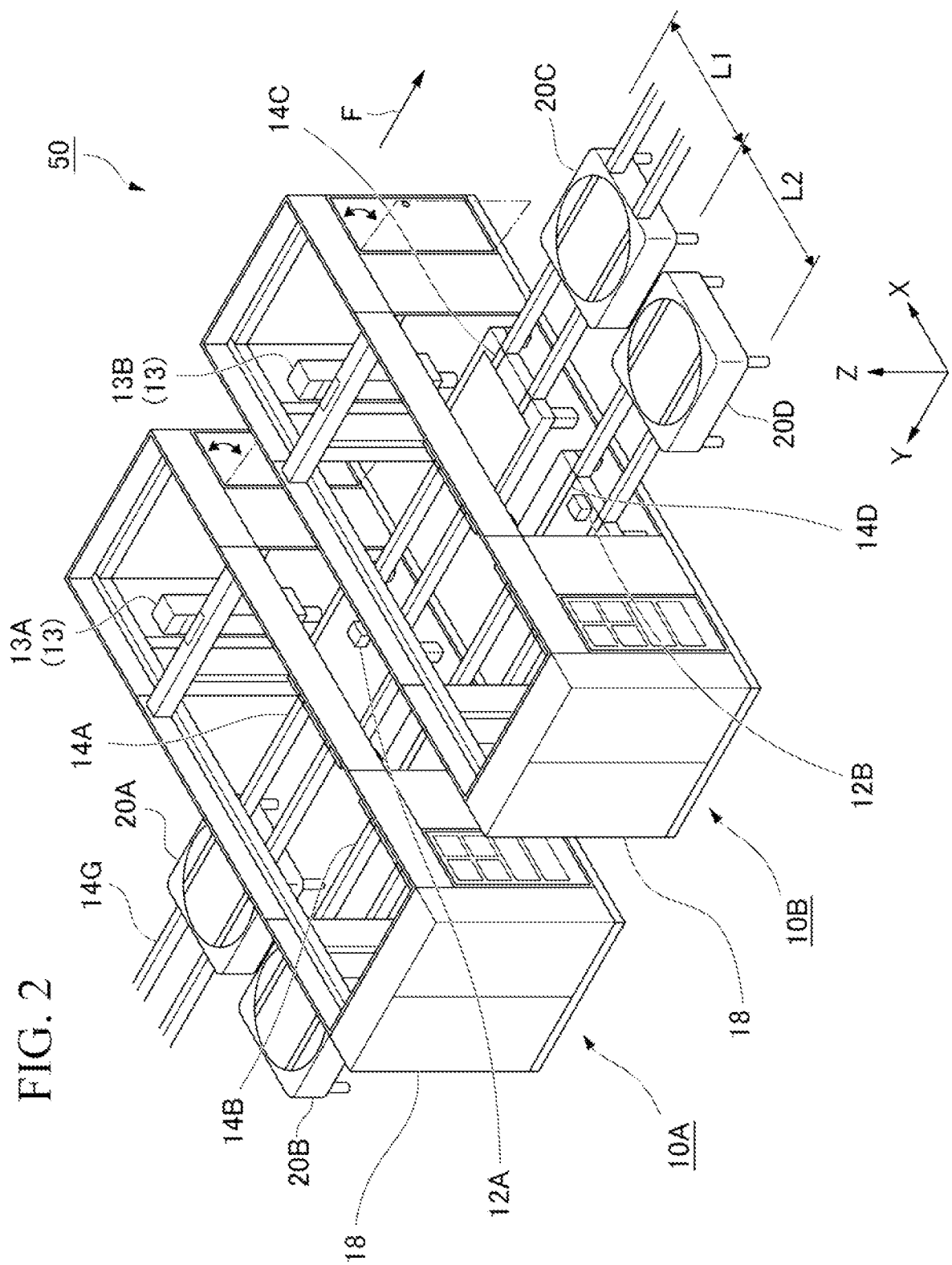
FIG. 2 is a perspective view representing a positional relationship between work devices 10A and 10B included in the working system 50.
Figure 3:
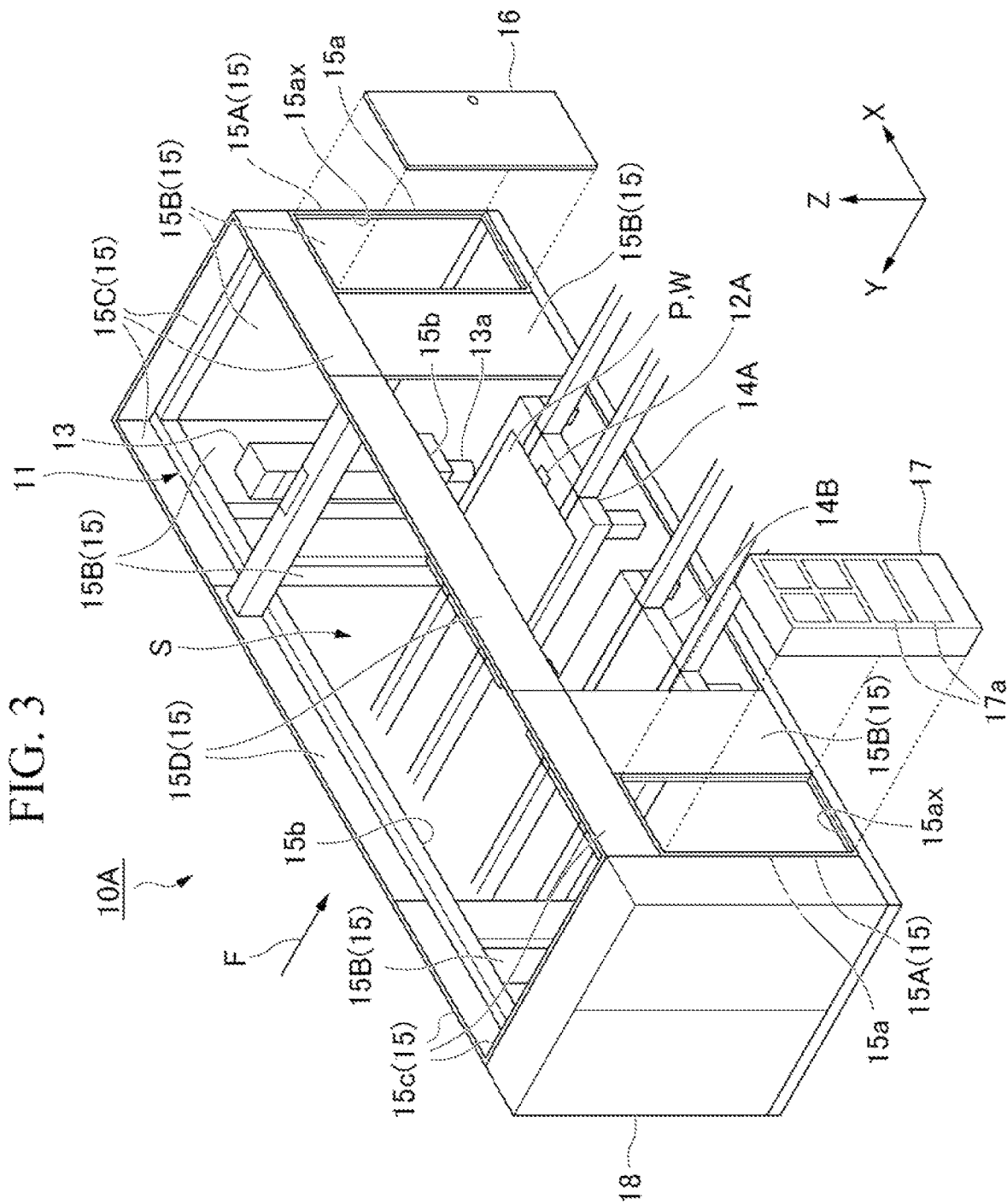
FIG. 3 is a perspective view for describing a detailed structure of the work device 10A included in the working system 50, and represents a state where a partition member 15 is attached thereto.
Figure 4:
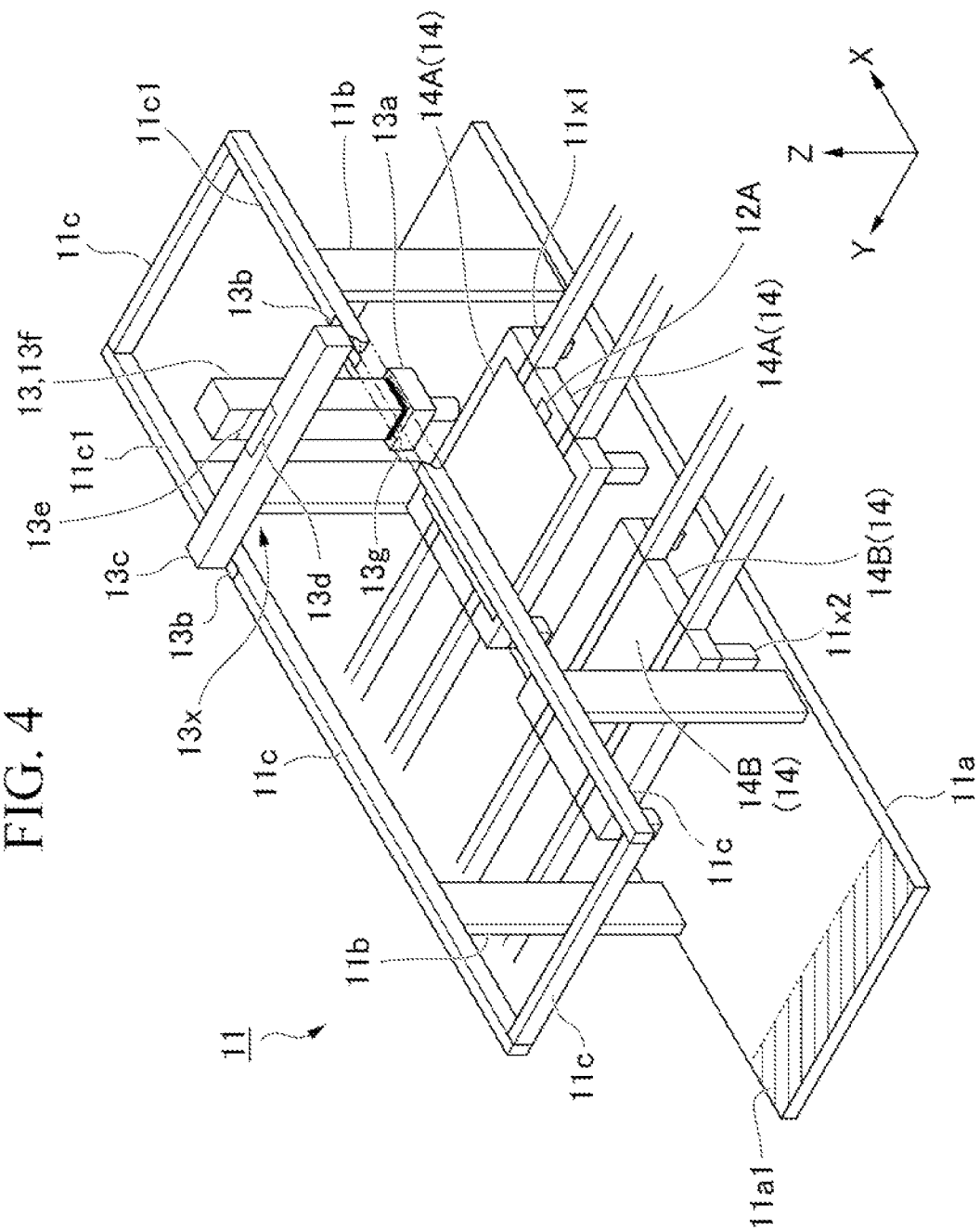
FIG. 4 is a perspective view for describing a detailed structure of the work device 10A, and represents a state where the partition member 15 is detached therefrom.
Figure 5:
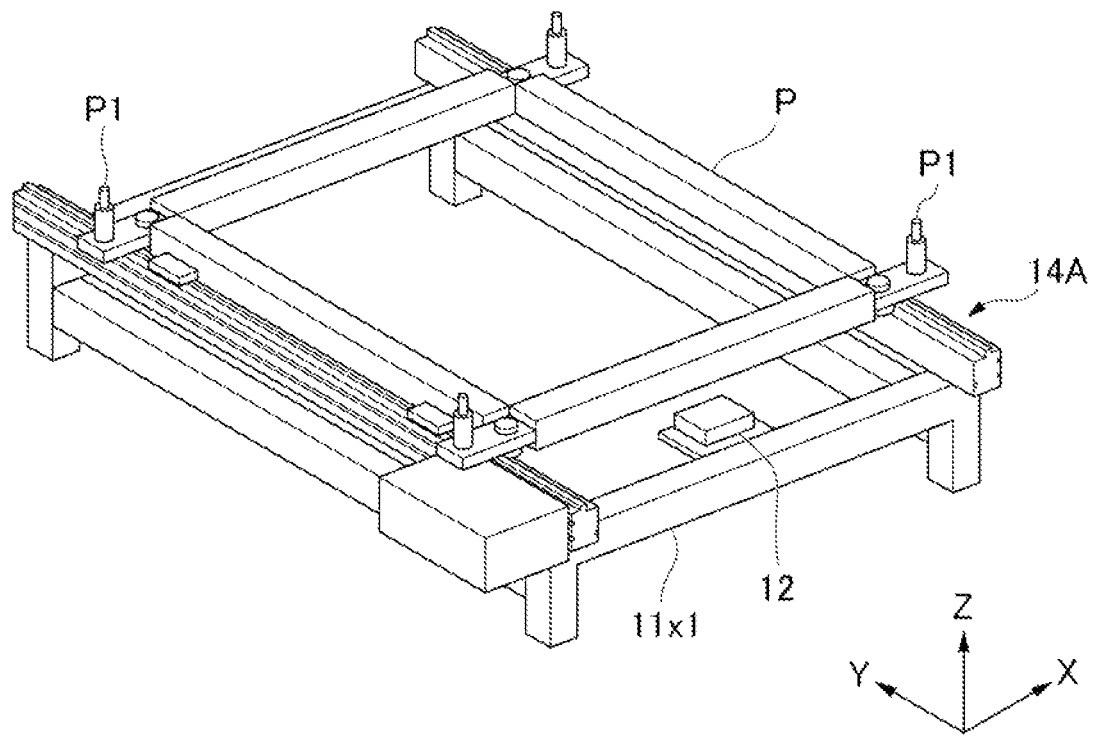
FIG. 5 is a perspective view of a conveying unit 14A included in the work device 10A.

FIG. 2 is a perspective view representing a positional relationship between the work stations 10A and 10B in the working system 50. FIGS. 3 and 4 are perspective views for describing a detailed structure of the work station 10A. FIG. 3 represents a state where a partition member 15 is attached thereto, and FIG. 4 represents a state where the partition member 15 is detached therefrom. FIG. 5 is a perspective view of the conveying unit 14A included in the work station 10A. Among X, Y, and Z in FIGS. 2 to 5, X and Y represent two orthogonal directions on a horizontal plane, and Z represents a normal direction with respect to the horizontal plane including X and Y.

As illustrated in FIGS. 3 and 4, the work station 10A includes a plurality of the partition members 15 that partition a work space S and an external space outside the work space S, a frame body 11 on which each of the partition members 15 is mounted, a positioning unit 12A (12) which is supported by the frame body 11 and holds the workpiece W at a predetermined position inside the work space S, a work unit 13 which is supported by the frame body 11 and carries out a predetermined work for the workpiece W held by the positioning unit 12A by using a work tool 13a, an opening-closing member 16 which is provided in the partition member 15 and opens and closes an opening 15ax (first opening) formed in the partition member 15, and an instrument attachment member 17 which is provided in the partition member 15 and to which a plurality of control instruments 17a for controlling an input instrument and an output instrument used in the work station 10A is attached.

Two panel bodies located in both ends in an X-direction of an XZ-plane of the partition member 15 are common panel bodies provided with a plurality of common mounting parts 15a on which the opening-closing member 16 and the instrument attachment member 17 are mutually and selectively mounted.

The work station 10A further includes a control device 18 that performs higher-level control on all instruments included in the work station 10A, and the two conveying units 14A and 14B which can transfer the workpiece W between the work space S and the external space.

As illustrated in FIG. 4, the frame body 11 includes a base 11a, a plurality of pillars 11b supported on the base 11a, and a plurality of beams 11c supported by upper ends of the pillars 11b. In the present embodiment, the base 11a is configured to include a flat plate having a rectangular horizontal plane. This horizontal plane is an upper surface of the base 11a, and serves as an installation surface on which each member of the work station 10A is installed. In the following description, a longitudinal direction of the horizontal plane of the base 11a may be referred to as the X-direction, a lateral direction may be referred to as a Y-direction, and a direction (vertical direction) perpendicular to the horizontal plane (XY-plane) of the base 11a may be referred to as a Z-direction in some cases.

A plurality of the pillars 11b extending in the vertical direction are erected on the horizontal plane of the base 11a. In the present embodiment, every two pillars 11b are disposed along each long side of the horizontal plane of the base 11a, and four pillars 11b in total are erected on the horizontal plane. In the upper end of the pillar 11b, a pair of the beams 11c extending in the X-direction is supported by each of the two pillars 11b. Both ends of the pair of beams 11c extending in the X-direction are connected to each other via the pair of beams 11c extending in the Y-direction, thereby forming a rectangular frame. X-axis rails 11c1 are respectively provided along the X-direction on each upper surface of the beam 11c extending in the X-direction.

The frame body 11 has a partition member mounting part on which each of the partition members 15 is mounted. Each of the partition members 15 is mounted on the partition member mounting part, thereby partitioning the work space S and the external space outside the work space S. In the present embodiment, the base 11a, the pillar 11b, and the beam 11c of the frame body 11 correspond to the partition member mounting part. The work space S is a space in which the predetermined work is carried out for the workpiece W and is a space surrounded by the partition members 15 in the X-direction and the Y-direction. Hereinafter, in the X-direction, a direction oriented inward of the work space S will be referred to as inward in the X-direction, and a direction oriented outward of the work space S will be referred to as outward in the X-direction. In addition, in the Y-direction, a direction oriented inward of the work space S will be referred to as inward in the Y-direction, and a direction oriented outward of the work space S will be referred to as outward in the Y-direction. In addition, surrounding the work space S with the partition members 15 includes surrounding the work space S with the partition members 15 without any gap, and surrounding the work space S with the partition members 15 which are partially open.

In addition, two support bases 11x1 and 11x2 are provided side by side on the horizontal plane of the base 11a. The conveying unit 14A is supported on one of the support bases 11x1 and 11x2, and the conveying unit 14B is supported on the other.

The work unit 13 is supported on the pair of beams 11c in a state of being movable in the X-direction by the pair of X-axis rails 11c1. The work unit 13 carries out the work for the workpiece W placed on the conveying unit 14A. Accordingly, a movement range in the X-direction may be limited to a range required for carrying out the work for the workpiece W placed on the conveying unit 14A.

In addition, a control device support surface 11a1 for supporting the control device 18 is formed in an end portion (left side of the drawings in FIGS. 3 and 4) along the X-direction on the horizontal plane of the base 11a. The control device support surface 11a1 enables the control device 18 to be installed outside the work space S (in the external space).

As illustrated in FIG. 4, the work unit 13 according to the present embodiment includes a work tool 13a, a pair of X-axis sliders 13b, a Y-axis guide 13c, a Y-axis slider 13d, and a Z-axis guide 13e. The pair of X-axis sliders 13b is supported to be movable along an X-axis rail 11c1 provided in the beam 11c. Each of the pair of X-axis sliders 13b includes an X-axis drive motor (not illustrated) serving as a drive source. The Y-axis guide 13c extending in the Y-direction is provided on the pair of X-axis sliders 13b. The respective X-axis drive motors are controlled and driven in synchronization with each other. In this manner, the pair of X-axis sliders 13b is moved along the X-axis rails 11c1 in synchronization with each other, thereby moving the Y-axis guide 13c. The Y-axis slider 13d is attached to the Y-axis guide 13c to be movable along the Y-axis guide 13c (Y-direction). The Z-axis guide 13e extending in the Z-direction is provided integrally with the Y-axis slider 13d. The Y-axis slider 13d includes a Y-axis drive motor (not illustrated) serving as a drive source for moving the Y-axis slider 13d. The Y-axis drive motor is driven to move the Y-axis slider 13d along the Y-axis guide 13c, thereby moving the Z-axis guide 13e. The X-axis slider 13b, the Y-axis guide 13c, and the Y-axis slider 13d configure a plane movement mechanism that freely moves the work tool 13a along a horizontal plane (XY-plane).

The work unit 13 further includes a Z-axis slider 13f and a rotation mechanism 13g. The Z-axis slider 13f is attached to the Z-axis guide 13e to be movable along the Z-direction. The Z-axis slider 13f is moved along the Z-direction by a Z-axis drive motor (not illustrated). The rotation mechanism 13g is provided in a lower end of the Z-axis slider 13f in the Z-direction. The rotation mechanism 13g holds the work tool 13a to be rotatable around a central axis (Z-axis) of the Z-axis slider 13f extending in the Z-direction. The Y-axis slider 13d, the Z-axis guide 13e, and the Z-axis slider 13f configure a vertical plane movement mechanism that freely moves the work tool 13a along a vertical plane (YZ-plane).

A movement unit 13x (first movement unit and second movement unit) that holds the work tool 13a to be movable in the X-direction, the Y-direction, and the Z-direction and rotatable around the Z-axis is configured to include the plane movement mechanism, the vertical plane movement mechanism, and the rotation mechanism 13g. According to the work unit 13, the predetermined work can be carried out by using the work tool 13a for the workpiece W placed on the conveying unit 14A held by the positioning unit 12A.

For example, the work tool 13a may include a nut runner for fastening the workpiece W with a screw. In addition, the work tool 13a may include a press-fitting head for press-fitting a component into the workpiece W, a fitting head for fitting a component to the workpiece W, an application head for applying an adhesive or a sealant to the workpiece W, and an assembly robot for assembling the workpiece W and the other component with each other. When the work tool 13a is the press-fitting head, the work stations 10A and 10B function as a press-fitting device. In addition, when the work tool 13a is the fitting head, the work stations 10A and 10B function as a fitting device. In addition, when the work tool 13a is the application head, the work stations 10A and 10B function as an application device. When the work tool 13a is the assembly robot (for example, a vertical 6-axis robot or a double-arm robot), the work stations 10A and 10B function as an assembly device.

In addition, a reversing unit that reverses front and back surfaces of the workpiece W may be provided as another work tool.

For example, in the work station including the work unit including the nut runner and the work unit including the reversing unit, first, the workpiece W positioned so that the front surface side faces upward is fastened with a screw from above the workpiece W by the nut runner. Subsequently, the workpiece W is reversed by the reversing unit so that the back surface side of the workpiece W is the upper surface, and the workpiece W is fastened with a screw from above the workpiece W by the nut runner. Then, the workpiece W may be reversed again by a reversing machine so that the front surface side of the workpiece W is the upper surface. Thereafter, the positioning of the workpiece W may be released, and the workpiece W may start to be conveyed again.

Since the above-described configuration is adopted, for example, as illustrated in FIG. 2, the workpiece W conveyed on the conveying unit 14A is positioned by the positioning unit 12A. Thereafter, when the work unit 13A carries out the work for the workpiece W, the other workpiece W can be freely conveyed on the conveying unit 14B juxtaposed with the conveying unit 14A. The reason is as follows. The control device 18 performs control for limiting a movement range of each movement mechanism of the respective work units 13A so that a work range (movable range) of the work unit 13A does not interfere with an upper region of the conveying unit 14B.

As illustrated in FIG. 4, each of the support bases 11x1 and 11x2 is a mount accommodated inside the work space S and placed on the horizontal plane of the base 11a. The two support bases 11x are installed side by side in the X-direction. The conveying unit 14A is provided on the support base 11x1 on the back side in the X-direction, and the conveying unit 14B is provided on the support base 11x2 on the front side in the X-direction, respectively. The conveying unit 14A and the conveying unit 14B are configured to include roller conveyors, and convey a pallet having the workpiece W placed thereon along the Y-direction (conveying direction F of the workpiece W). Each of the conveying units 14 is disposed in the work space S to face an opening 15b (to be described later) in the Y-direction.

The positioning unit 12A is provided in the conveying unit 14A out of the conveying units 14A and 14B, and the workpiece W conveyed on the first conveying lane L1 is positioned inside the work space S by the positioning unit 12A. On the other hand, the other workpiece W conveyed on the conveying unit 14B is not positioned, and passes through the second conveying lane L2 without any change. That is, the workpiece W conveyed by a conveying unit 14G of a work station (not illustrated) is branched from the first conveying lane L1, is guided to the second conveying lane L2, and is conveyed on the conveying unit 14B. Thereafter, the work is not carried out for the workpiece W conveyed to the work station 10A in the work station 10A. The workpiece W is conveyed to the conveying unit 14D (work station 10B) without any change.

FIG. 5 is a perspective view representing the support base 11x1 and the conveying unit 14A.

As illustrated in FIG. 5, the support base 11x1 supports the conveying unit 14A and the positioning unit 12A. The positioning unit 12A is fixed to the support base 11x1 via a bracket or the like (not illustrated). Alternatively, the positioning unit 12A may be directly fixed to the base 11a illustrated in FIG. 4.

As the positioning unit 12A, all positioning units are applicable as long as the positioning units are ordinarily used as stoppers of a conveyor, and examples thereof include an air drive stopper and an electric stopper. The preferable positioning unit 12A is the electric stopper that does not require an arrangement or a layout work of an air hose. A pallet P is positioned by bringing the positioning unit 12A into contact with the pallet P conveyed by the conveying unit 14A.

A position of the workpiece W placed on the pallet P is defined by a plurality of pins P1 formed on the upper surface of the pallet P. Accordingly, the pallet P is positioned by the positioning unit 12A, thereby positioning the workpiece W.

As illustrated in FIG. 3, each of the partition members 15 is configured to include a plurality of panel bodies 15A to 15D. Each of the panel bodies 15A to 15D is mounted on the frame body 11, thereby forming a wall surface that partitions the work space S from the external space. Here, "partitioning" the work space S and the external space by the partition member 15 means that the work space S is specified by each wall surface configuring the partition member 15, an extension surface of each wall surface, and an imaginary plane connecting end edges of the facing wall surfaces to each other.

First, out of the respective partition members 15, the partition member disposed along the XZ-plane on the front side of the drawing will be described.

On the XZ-plane, the two panel bodies 15A located in both ends in the X-direction have a common mounting part 15a on which the opening-closing member 16 and the instrument attachment member 17 are mutually and selectively mounted, and have common outer dimensions. The common outer dimensions described herein mean that at least dimensions on the plane for partitioning the work space S and the external space are the same as each other. In addition, the respective common mounting parts 15a also have the same shape and size.

In addition, a panel body 15B having an outer dimension the same as that of the panel bodies 15A is disposed adjacent to each of the two panel bodies 15A.

Horizontally long panel bodies 15C are disposed above the panel bodies 15A and 15B adjacent to each other. Furthermore, a horizontally long panel body 15D is further disposed on the opening 15b formed between the pair of panel bodies 15B.

Out of the respective partition members 15, the partition member disposed along the XZ-plane on the back side of the drawing also have a disposition configuration which is substantially the same as that of the above-described partition member on the front side of the drawing. However, the panel body 15B is provided instead of the panel body 15A on the XZ-plane on the back side of the drawing.

The panel bodies 15A to 15D are mounted on the base 11a, the pillar 11b, or the beam 11c.

The opening 15b is a horizontally long rectangular space formed by a lower edge of the panel body 15D, each side edge of the pair of panel bodies 15B, and an upper surface of the base 11a. The openings 15b are formed at the same position when viewed in the conveying direction F on both the XZ-plane on the front side of the drawing and the XZ-plane on the back side of the drawing. The work space S and the external space communicate with each other through the two openings 15b. When viewed in the Y-direction (conveying direction F), the workpiece W can be loaded and unloaded between both the conveying units 14A and 14B.

Subsequently, out of the respective partition members 15, the partition member disposed along the YZ-plane will be described.

The two panel bodies 15B disposed side by side in the Y-direction on the base 11a and the panel body 15C disposed on the panel bodies 15B are provided on the YZ-plane. The panel bodies 15B and 15C on the YZ-plane are the same as the panel bodies 15B and 15C on the XZ-plane. The panel bodies 15B and 15C are mounted on the base 11a and the beam 11c.

The panel bodies 15B and 15C are also provided on one of the two YZ-planes in the work station 10A having the control device 18. However, the one is a surface covered by the control device 18. Thus, the panel bodies 15B and 15C may be omitted from only the surface.

The opening-closing members 16, which are mutually and selectively mounted on the common mounting part 15a, open and close the opening 15ax formed in the common mounting part 15a. The opening 15ax causes the work space S and the external space to communicate with each other, and serves as an entrance-exit when a worker enters and exits the work space S. Although a door is used as the opening-closing member 16 in the illustrated example, a shutter or the like may be used instead of the door.

The control instrument 17a that controls an input instrument and an output instrument (not illustrated) which are used in the work station 10A (for example, the control instrument that controls the input instrument and the output instrument which are included in the positioning unit 12 and the work unit 13) is attached to the instrument attachment members 17 which are mutually and selectively mounted on the common mounting part 15a. Examples of the control instrument 17a include a control instrument that amplifies an input signal of a sensor or diagnoses an operation state, a solenoid valve that switches pressure operations performed on a pressure cylinder, and the like. A worker operates the control instrument 17a outside the work space S, thereby controlling various instruments included in the positioning unit 12 and the work unit 13 of the work station 10A.

The control device 18 is placed on the base 11a in the external space. The control device 18 is adjacent to the partition member 15 or the work space S to partition the work space S from the external space. The control device 18 performs higher-level control of all instruments included in the work station 10A, such as the positioning unit 12A, the work unit 13, and the conveying units 14A and 14B. In the present embodiment, the control device 18 is a housing that houses a switch for controlling electric power supplied to the instruments included in the work station 10A, a distributor, a breaker, a controller including an operation program of the work station 10A, and the like.

Hitherto, the detailed structure of the work station 10A has been described. The work station 10B disposed on the downstream side of the work station 10A has the same structure. However, the following point is different. That is, as illustrated in FIG. 4, in the work station 10A, the positioning unit 12A is disposed in the mount 11x1 on the back side of the X-axis. In contrast, in the work station 10B, the positioning unit 12B is disposed in the mount 11x2 on the front side of the X-axis.

[Work Method]

Next, a work method using the working system 50 described above, that is, a procedure for carrying out a predetermined work for a plurality of the workpieces W will be described below. In the following example, a case will be described as follows. As the plurality of workpieces W, the first workpiece W is first supplied, and thereafter, the second workpiece W is supplied so that the predetermined work is carried out for both the first workpiece W and the second workpiece W. The predetermined work carried out for the first workpiece W and the predetermined work carried out for the second workpiece are carried out in parallel with a slight time difference. However, the first workpiece W will be first described, and the second workpiece W will be subsequently described.

The first workpiece W conveyed from the upstream side in the conveying direction F passes through the turntable 20A, and is guided to the conveying unit 14A by the conveying unit 14G of the work station (not illustrated) in the first lane L1 illustrated in FIG. 1. Thereafter, the first workpiece W is conveyed into the work station 10A, and is positioned by the positioning unit 12A provided in the conveying unit 14A. Thereafter, the work unit 13A (13) carries out the predetermined work for the first workpiece W.

After the predetermined work is completed, the positioning of the first workpiece W by the positioning unit 12 is released, the conveying unit 14A starts to convey the workpiece W again, and the workpiece W is guided to the conveying unit 14B of the work station 10B. The first workpiece W is not positioned inside the work station 10B, passes through the work station 10B without any change, and is conveyed outward of the work station 10B. The first workpiece W further passes through the subsequent turntable 20C, and is conveyed onto the conveying unit 14E of the work station 10C. The first workpiece W is positioned in the work station 10C, and a work different from the work carried out in the work station 10A is carried out for the first workpiece W.

The first workpiece W for which the predetermined work is completed in the work station 10C is guided to the conveying unit 14F via the conveying unit 14E. Thereafter, the first workpiece W is conveyed into the work station 10D. The first workpiece W is positioned by the positioning unit 12D in the work station 10D, and a work different from the work carried out so far is carried out for the first workpiece W. The first workpiece W for which the predetermined work is completed in the work station 10D is conveyed onto the first lane L1 along the conveying direction F via the conveying unit 14F.

Out of all works carried out for the first workpiece W, a work time of the work in the work station 10A may be too long, thereby causing a production bottleneck. In some cases, the work station 10A alone may not be able to satisfy a desired cycle time. In this case, in the working system 50 according to the present embodiment, the work stations 10A and 10B are juxtaposed to be adjacent to each other. In addition, in the working system 50, the respective control devices 18 and 18 control and operate the conveying units 14A to 14D, the positioning units 12A and 12B, and the work units 13A and 13B as if the two work stations function as one work station. In this manner, the works for the two workpieces W can be carried out at the substantially same time.

In this manner, even when the respective work times in the work stations 10A and 10B remain the same, the number of the produced workpieces W for which the work is completed per unit time is doubled. Accordingly, a substantial cycle time is reduced by half. As a result, it is possible to reduce possibilities that the work stations 10A and 10B may be a production bottleneck with respect to the other work stations 10C and 10D. That is, the working system 50 achieves satisfactory productivity.

Figure 7:
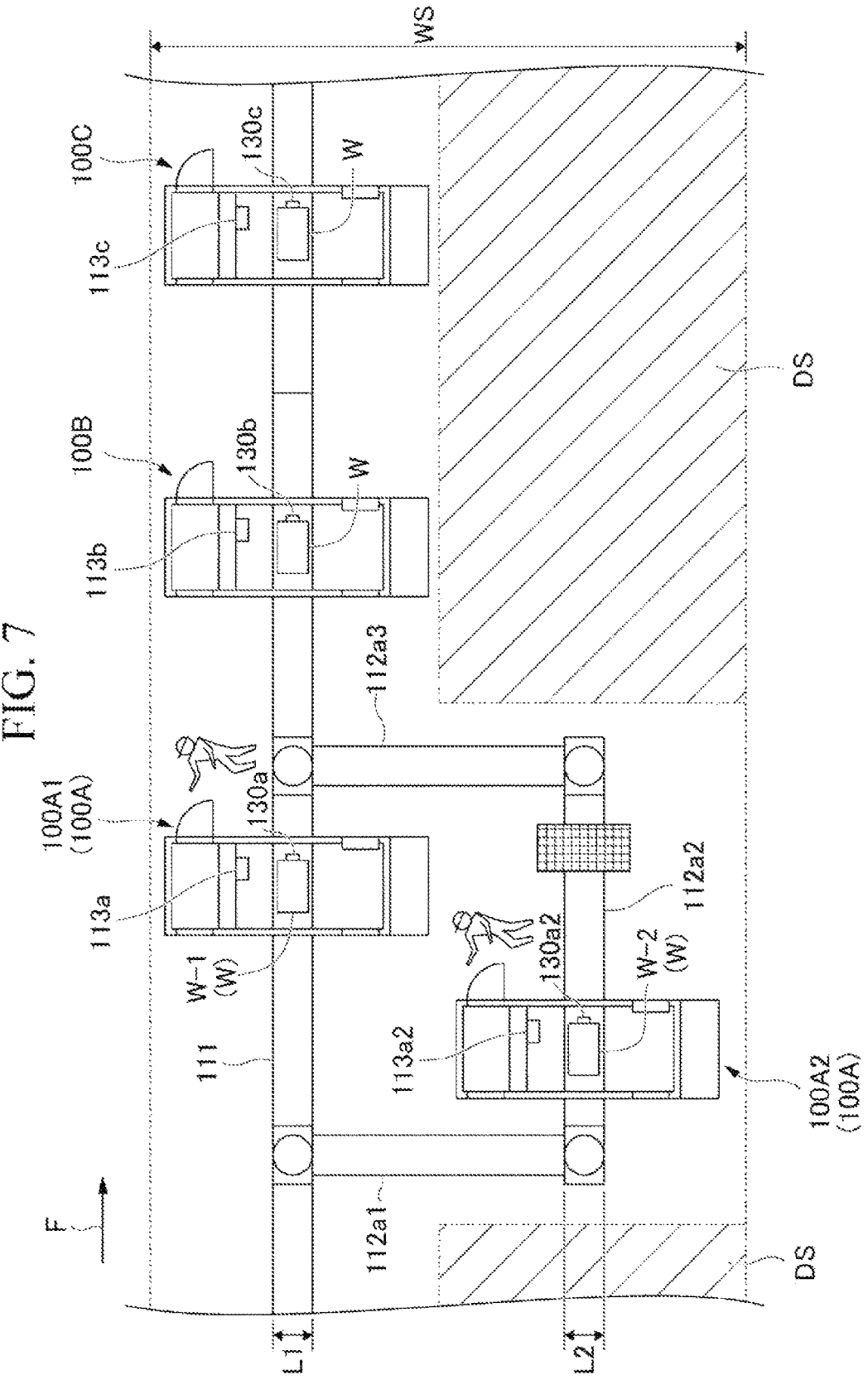
FIG. 7 is a plan view representing a working system in the related art.

In addition, in the working system 50, the work stations 10A and 10B are juxtaposed to be adjacent to each other (disposed in series). In this manner, when the working system 50 and the two work stations 100A1 and 100A2 illustrated in FIG. 7 are compared with each other, an installation area of facilities in a factory can be significantly reduced. In addition, comparing the production line using the working system 50 illustrated in FIG. 1 with the production line illustrated in FIG. 7, a dead space (hatched region in FIGS. 1 and 7) in the factory can be significantly reduced.

Figure 6:
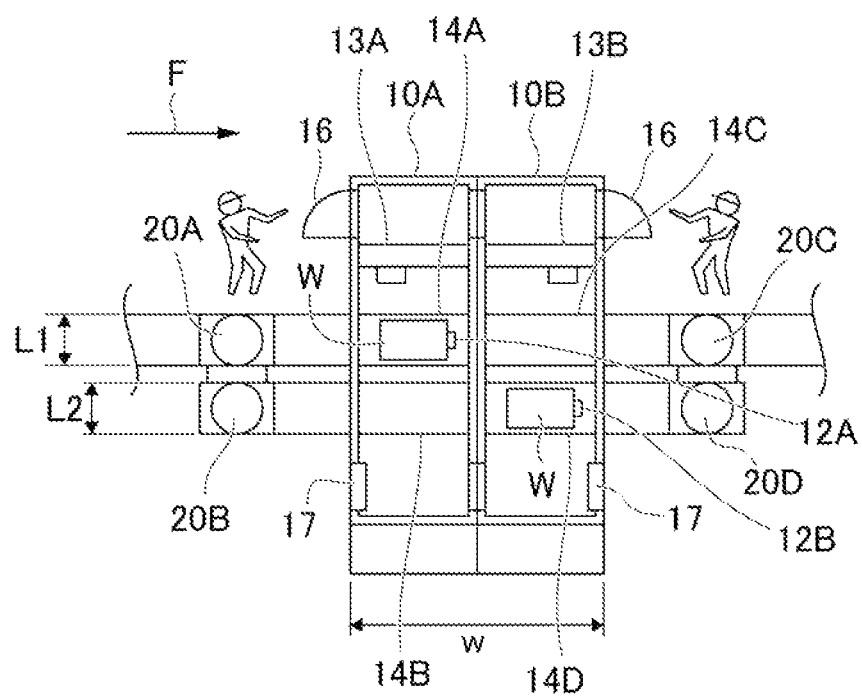
FIG. 6 is a plan view representing a modification example of the working system 50.

Furthermore, in the work stations 10A and 10B in the working system 50 according to the present embodiment, a door position thereof can be changed. For example, as illustrated in FIG. 6, attachment positions of the opening-closing member 16 and the instrument attachment member 17 in the work station 10A may be laterally opposite to each other (laterally symmetric to each other). In this manner, a distance between the work stations 10A and 10B can be further shortened, and a worker can freely access the inside of the work stations 10A and 10B without causing the doors to interfere with each other. The work stations 10A and 10B may be closely disposed without any gap. Since this configuration is applied to the plurality of work stations, the installation area of the working system can be further reduced.

Hitherto, an embodiment according to the present invention has been described. However, the present invention is not limited to the above-described configurations. Various modifications can be made within the scope not departing from the concept of the present invention.

The partition member 15 is not limited to the plurality of panel bodies 15A to 15D, and for example, may be a wire net mounted on (supported by) the frame body 11 to partition the work space S and the external space.

Furthermore, the frame body 11 may be the base 11a only, and the partition member 15 alone may be erected on the installation surface of the base 11a. In this case, the base 11a corresponds to the partition member mounting part. In addition, when the partition member 15 alone is erected, a pillar-shaped support member (not illustrated) may be vertically erected on the installation surface of the base 11a to serve as part of the frame body 11, and the partition member 15 may be attached to a side surface of the pillar-shaped support member.

A configuration of the work unit 13 is not limited to the above-described configuration, and can be changed as appropriate depending on contents of the work to be carried out. For example, a multi joint robot may be used as the work unit 13, and a partial region of the base 11a on which the multi joint robot is installed may be used as the work unit support part.

In addition, the conveyor has been described as an example of the respective conveying units 14A to 14F. However, without being limited to the conveyor, a self-propelled carrier may be used. In addition, only part of the respective conveying units 14A to 14F may be the self-propelled carrier.

In addition, the "predetermined work" in the above description is not limited to one work (operation), and may include a plurality of works (operations).

In addition, in the above-described embodiment, an example has been described in which the workpiece W is branched from the first conveying lane L1 to the branch line (second conveying lane L2), that is, an example in which there are two parallel conveying lanes. However, three or more conveying lanes (two or more branch lines) may be provided. In this case, the work stations may be additionally provided by the number of branch lines. The work stations may be disposed in series to be adjacent to each other along the conveying direction F. Each of the work stations may have a single opening (first opening) into which all of the conveying units can be inserted. However, in view of a size of the work station and an opening width of the first opening, the number of work stations configuring the working system 50 is preferably two or three.

INDUSTRIAL APPLICABILITY

According to the working system and the work method in the aspect of the present invention, satisfactory productivity is achieved, and an installation area and a dead space of facilities in a factory can be reduced.

REFERENCE SIGNS LIST 10A work station (first work station)
10B work station (second work station)
11 frame body
11a base (base, partition member mounting part)
11a1 control device support surface (control device support part)
11b pillar (pillar, partition member mounting part)
11c beam (beam, partition member mounting part)
11c1 X-axis rail (first guide, second guide)
11x support base (positioning unit support part)
12A, 12B, 12C, 12D positioning unit (first positioning unit, second positioning unit)
13a work tool (first work unit, second work unit)
13b X-axis slider (first slider, second slider, work unit support part)
13c Y-axis guide (work unit support part)

13d Y-axis slider (work unit support part)
13e Z-axis guide (work unit support part)
13g rotation mechanism (work unit support part)
13x movement unit (first movement unit, second movement unit)
14A conveying unit (first conveying unit, third conveying unit)
14B conveying unit (second conveying unit, fourth conveying unit)
15 partition member
15A panel body, common panel body
15a common mounting part
15ax opening (first opening)
15B, 15C, 15D panel body
15b opening (second opening, third opening, fourth opening, fifth opening)
16 opening-closing member
17 instrument attachment member
17a control instrument (first control instrument, second control instrument)
18 control device
50 working system
S work space
W workpiece, first workpiece, second workpiece

The invention claimed is:

1. A working system comprising:
a first conveying lane conveying a first workpiece and a second workpiece,
a second conveying lane conveying the second workpiece,
a first work station that carries out a predetermined work for the first workpiece conveyed on the first conveying lane;
a second work station disposed in series downstream of the first work station to carry out the predetermined work for the second workpiece conveyed on the second conveying lane, and
a branch unit disposed on an upstream side of the first work station,
wherein the first work station includes
  a first conveying unit that conveys the first workpiece,
  a second conveying unit juxtaposed with the first conveying unit to convey the second workpiece,
  a first positioning unit that positions the first workpiece conveyed by the first conveying unit at a predetermined position inside the first work station, and
  a first work unit that carries out the predetermined work for the first workpiece positioned on the first conveying unit by the first positioning unit,
the second work station includes
  a third conveying unit that conveys the first workpiece,
  a fourth conveying unit juxtaposed with the third conveying unit to convey the second workpiece,
  a second positioning unit that positions the second workpiece conveyed by the fourth conveying unit at a predetermined position inside the second work station, and
  a second work unit that carries out the predetermined work for the second workpiece positioned on the fourth conveying unit by the second positioning unit,
each of the first work station and the second work station includes
  a partition member that partitions a work space for carrying out the predetermined work and an external space outside the work space, and
  a frame body on which the partition member is mounted,
an upper end of the frame body includes a pair of beams extending in an X-and a pair of beams extending in a Y-direction,
each of the first work unit and the second work unit includes
  a pair of X-axis sliders moving in the X-direction along X-axis rails provided in the pair of beams extending in the X-direction,
  a Y-axis guide provided across the pair of X-axis sliders,
  a Y-axis slider moving in the Y-direction along the Y-axis guide,
  a Z-axis guide provided integrally with the Y-axis slider,
  a Z-axis slider moving in a Z-direction along the Z-axis guide, and
  a work tool held at a lower end of the Z-axis slider,
the third conveying unit is connected to a downstream portion of the first conveying unit,
the first conveying lane includes the first conveying unit and the third conveying unit,
the fourth conveying unit is connected to a downstream portion of the second conveying unit,
the second conveying lane includes the second conveying unit and the fourth conveying unit,
the branch unit connects an upstream portion of the first conveying unit and an upstream portion of the second conveying unit,
the branch unit includes a first turntable,
the first turntable includes a fifth conveying unit,
the first conveying lane further includes the fifth conveying unit, and
the first turntable supports the fifth conveying unit to be rotatable to connect a downstream portion of the fifth conveying unit to the upstream portion of the first conveying unit or to the second conveying lane.

2. The working system according to claim 1,
wherein the first work station further includes
  a first movement unit that moves the first work unit, and
  a first control instrument that controls the first movement unit and the first work unit,
the second work station further includes
  a second movement unit that moves the second work unit, and
  a second control instrument that controls the second movement unit and the second work unit.

3. The working system according to claim 2,
wherein the first movement unit includes a first guide which is included in the X-axis rails of the first work unit and provided above the first conveying unit and the second conveying unit, and a first slider which is included in the pair of X-axis sliders of the first work unit and movable along the first guide,
the first work unit is provided on the first slider,
the second movement unit includes a second guide which is included in the X-axis rails of the second work unit and provided above the third conveying unit and the fourth conveying unit, and a second slider which is included in the pair of X-axis sliders of the second work unit and movable along the second guide, and
the second work unit is provided on the second slider.

4. The working system according to claim 1,
wherein the first work unit includes
  a first reverser that reverses the first workpiece conveyed by the first conveying unit, and
  a first work tool that carries out the predetermined work for the first workpiece, and the second work unit includes
- a second reverser that reverses the second workpiece conveyed by the fourth conveying unit, and
- a second work tool that carries out the predetermined work for the second workpiece.

5. The working system according to claim 1,
wherein each of the first work station and the second work station includes
- an opening-closing member provided in the partition member to open and close a first opening formed in the partition member, and
- an instrument attachment member provided in the partition member, and to which a first control instrument that controls a first movement unit that moves the first work unit and the first work unit, or a second control instrument that controls a second movement unit that moves the second work unit and the second work unit is attached, and the partition member has a plurality of common mounting parts on which the opening-closing member or the instrument attachment member is selectively mounted.

6. The working system according to claim 5,
wherein the frame body of the first work station includes
- a first positioning unit support part that supports the first positioning unit, and
- a first work unit support part that supports the first work unit, the frame body of the second work station includes
- a second positioning unit support part that supports the second positioning unit and
- a second work unit support part that supports the second work unit, and each of the frame body of the first work station and the frame body of the second work station includes a partition member mounting part on which the partition member is mounted.

7. The working system according to claim 6,
wherein the frame body includes a base, a pillar supported by the base, and a beam supported by the pillar,
the positioning unit support part is provided on the base or the pillar, and
the work unit support part is provided on the beam.

8. The working system according to claim 6,
wherein the frame body includes a base, a pillar supported by the base, and a beam supported by the pillar,
the positioning unit support part is provided on the base or the pillar, and
the work unit support part is provided on the base.

9. The working system according to claim 6,
wherein the work unit support part of at least one of the first work station and the second work station further includes a plane movement mechanism that moves the first work unit or the second work unit on a plane.

10. The working system according to claim 5,
wherein at least one of the first work station and the second work station includes
- a control device that performs higher-level control on all instruments included in the one of first work station and the second work station, and the frame body of the one of the first work station and the second work station includes a control device support part that supports the control device in the external space.

11. The working system according to claim 5,
wherein the partition member of at least one of the first work station and the second work station is configured to include a plurality of panel bodies, the plurality of panel bodies include a common panel body provided with the common mounting part, and
the opening-closing member or the instrument attachment member is selectively mounted on the common mounting part of the common panel body.

12. The working system according to claim 5,
wherein a second opening and a third opening which communicate with the first conveying unit and the second conveying unit are formed in the partition member of the first work station, and
a fourth opening and a fifth opening which communicate with the third conveying unit and the fourth conveying unit are formed in the partition member of the second work station.

13. The working system according to claim 5,
wherein the partition member, the frame body, the opening-closing member, and the instrument attachment member of the first work station has the same structures as the partition member, the frame body, the opening-closing member, and the instrument attachment member of the second work station, respectively.

14. The working system according to claim 1, further comprising
a merge unit disposed on a downstream side of the second work station,
wherein the merge unit is connected to a downstream portion of the third conveying unit and a downstream portion of the fourth conveying unit.

15. The working system according to claim 14,
wherein the branch unit further includes a second turntable,
the merge unit further includes a third turntable and a fourth turntable,
the second turntable includes a sixth conveying unit,
the third turntable includes a seventh conveying unit,
the fourth turntable includes an eighth conveying unit,
the first conveying lane further includes the seventh conveying unit,
the second conveying lane further includes the sixth conveying unit and the eighth conveying unit,
the second turntable supports the sixth conveying unit to be rotatable to connect an upstream portion of the sixth conveying unit to the downstream portion of the fifth conveying unit or to connect a downstream portion of the sixth conveying unit to the upstream portion of the second conveying unit,
the third turntable supports the seventh conveying unit to be rotatable to connect an upstream portion of the seventh conveying unit to the downstream portion of the third conveying unit or to a downstream portion of the eighth conveying unit, and
the fourth turntable supports the eighth conveying unit to be rotatable to connect an upstream portion of the eighth conveying unit to the downstream portion of the fourth conveying unit or to connect the downstream portion of the eighth conveying unit to the upstream portion of the seventh conveying unit.

16. The working system according to claim 15,
wherein the first conveying lane further includes
- a ninth conveying unit which is disposed on an upstream side of the branch unit and conveys the first workpiece and the second workpiece, and
- a tenth conveying unit which is disposed on a downstream side of the merge unit and conveys the first workpiece and the second workpiece, the ninth conveying unit is connected to an upstream portion of the fifth conveying unit, and the tenth conveying unit is connected to a downstream portion of the seventh conveying unit.

\* \* \* \* \*